Jan. 13, 1931.  F. TOEWE  1,788,812
SELF STARTING SYNCHRONIZED MOTOR DRIVE MEANS FOR CLOCKS
Filed Aug. 2, 1929

INVENTOR
Fritz Toewe,
BY
Harold D. Penney, ATTORNEY

Patented Jan. 13, 1931

1,788,812

UNITED STATES PATENT OFFICE

FRITZ TOEWE, OF VILLINGEN, GERMANY, ASSIGNOR, BY MESNE ASSIGNMENTS, TO KIENZLE TAXAMETER UND APPARATE A. G., OF VILLINGEN, GERMANY, A CORPORATION OF GERMANY

SELF-STARTING SYNCHRONIZED MOTOR-DRIVE MEANS FOR CLOCKS REISSUED

Application filed August 2, 1929, Serial No. 382,882, and in Germany August 12, 1928.

This invention relates to improvements in a synchronous motor for driving clocks and the like, and it consists in the novel features, which are hereinafter described.

One of the objects of my invention is to make a synchronous motor self starting.

Another object of my invention is to produce a more perfect synchronous motor than is at present in use.

A further object of my invention is to facilitate the starting and the synchronization or falling into step of the component parts of my motor.

A still other object of my invention is to have my improved synchronous motor simple, durable and inexpensive.

Other objects and advantages will hereinafter appear.

I attain these objects in one embodiment of my invention by employing a rapidly revolving Ferraris rotating field, from which is branched off a multi-polar alternating field for a synchronous motor of slower rotary speed.

In order to facilitate the starting and falling into step of the synchronous rotor when operating together with the asynchronous rotor, both rotors are coupled by means of a flexible connection.

The details of the above form of my invention are illustrated in the accompanying drawings; and the objects of my invention may also be attained by any mechanical equivalent or obvious modification of the same.

In the drawings.

Like numerals refer to like parts throughout the two views.

Figure 1:
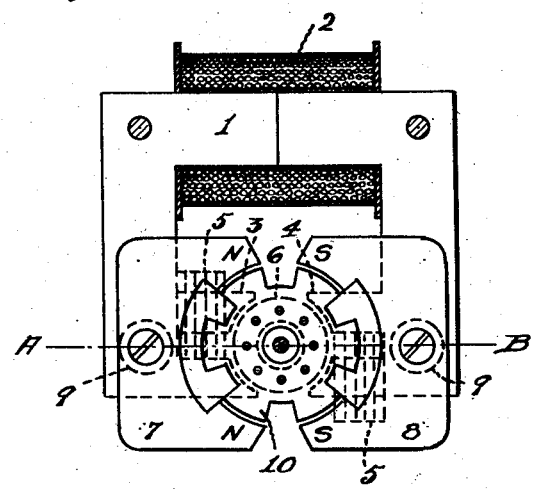
Fig. 1 is a front elevation of my synchronous motor.
Figure 2:
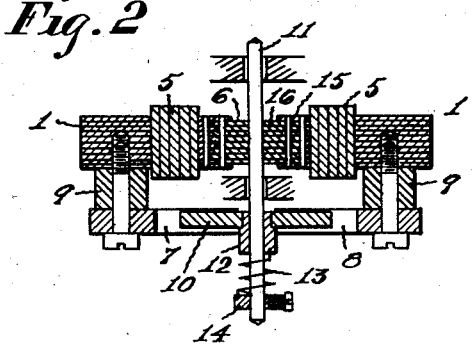
Fig. 2 is a section on the line A—B of Fig. 1.

1 designates the stator and 2 the exciter winding, which together constitute the field of my synchronous motor.

The pole pieces 3 and 4 are split and each half is provided with a shielding coil 5, thereby producing a Ferraris rotating field with one pair of poles. A short-circuit rotor 6, of a construction known to the prior art and consisting of a copper cage 15 with laminated soft-iron core 16, is movably disposed in this rotating field.

To each of the two legs of the stator 1 is secured a pole piece 7, 8 with intermediate supports 9, 9 made of magnetically conducting material with the result that a rotating field for the synchronous rotor 10, made of magnetic steel, is produced between the poles of the pole pieces 7 and 8 as an auxiliary field for the synchronous motor. In the example shown, the alternating field of the synchronous motor is divided for a 6-pole rotor; however, on both sides of the vertical plane of symmetry one pole of each is eliminated; so that there exist on each side two piles only of the same sign, N, N or S, S. Hence, these poles are disposed in the correct pole distribution of a 6-pole field.

The synchronous rotor 10 is rotatably disposed on the axle 11 of the asynchronous rotor 6 by means of a bearing box 12 and is coupled with the asynchronous rotor 6 by means of a helical spring 13, which is attached on the one side to a bearing box 12 and, on the other side, to an adjusting collar 14, which is clamped onto shaft 11.

It is evident that the Ferraris rotating field with the one pair of poles 3 and 4 revolves more rapidly than the 6-pole synchronous rotor 10. The flexible coupling between the two rotors 6 and 10 serves to allow the asynchronous rotor 6, whose starting torsional moment, in case of a rigid connection with the synchronous rotor 10, would not be sufficient to force the latter out of its rest position, to accumulate first enough force, with a simultaneous imparting of a tension to spring 13, to force the synchronous rotor out of its position of rest and keep it moving. Inasmuch as the asynchronous rotor 6, for instance when operating with a-c. of 50 periods, has the tendency to reach a rotary speed of 3000 R. P. M., it rapidly imparts to the synchronous rotor 10, whose synchronous rotary speed is 1000, this number of revolutions. As soon as the synchronous rotor has fallen in step, it takes the lead with respect to the asynchronous motor; from this moment on, the spring 13 acts in the opposite direction upon the asynchronous armature in the manner that the latter is forced to maintain the rotary speed of the synchronous motor.

If a decrease of the rotary speed of the synchronous rotor is not desired, the alternating field of the synchronous motor, and, accordingly, of its rotor, may, of course, be provided with one pair of poles only.

Variations are possible, and parts of my invention may be used without other parts. I do not, therefore, restrict myself to the details as shown in the drawings but I intend to include also all mechanical equivalents and obvious modifications of the same within the scope of my invention.

I claim as my invention and desire to secure by Letters Patent:

1. In a self starting synchronous motor for driving clocks and the like, in combination, an asynchronous rotor having a rapidly revoluble Ferraris rotating field, and a synchronous rotor having a multi-polar alternating field branched off from said Ferraris rotating field; said rotors being interconnected by flexible means.

2. In a self starting synchronous motor for driving clocks and the like, in combination, an asynchronous rotor having a rapidly revoluble Ferraris rotating field, and a synchronous motor of slower rotational speed having a multi-polar alternating field branched off from said Ferraris rotating field, the shafts of said rotors being yieldingly coupled.

3. In a self starting synchronous motor for driving clocks and the like, in combination, an asynchronous rotor having a high speed Ferraris rotating field, a magnetic steel synchronous rotor having an alternating field, said alternating field including opposite pole pieces, said pole pieces being connected magnetically with the stator of said Ferraris rotating field, and a yielding coupling between the supports of said rotors.

4. A device of the class described, an asynchronous rotor having a high speed Ferraris rotating field, a synchronous rotor of magnetic material, pole pieces arranged at opposite sides of said rotor, said pole pieces being magnetically connected to the stator of said Ferraris field and yielding means for coupling the supports of said rotors.

Signed at Stuttgart, in the county of and State of Germany this 19th day of July, A. D. 1929.

FRITZ TOEWE.